United States Patent Office 3,702,760
Patented Nov. 14, 1972

3,702,760
USE OF 2,6 - DI-TERT-BUTYL-4-METHYLPHENYL N - DICHLOROACETYL-N-METHYLCARBAMATE AS A HERBICIDE
Albert H. Haubein, Newark, Del., assignor to Hercules Incorporated, Wilmington, Del.
No Drawing. Original application Apr. 19, 1968, Ser. No. 722,553, now Patent No. 3,531,515. Divided and this application June 3, 1970, Ser. No. 54,028
Int. Cl. A01n 9/24
U.S. Cl. 71—106
5 Claims

ABSTRACT OF THE DISCLOSURE

Disclosed is the use of 2,6-di-t-butyl-4-methylphenyl N-dichloroacetyl-N-methylcarbamate as a preemergence herbicide for annual weedy grasses in rice fields.

---

The application is a division of the U.S. patent application, Ser. No. 722,553, filed Apr. 9, 1968, on which U.S. Pat. 3,531,515 was granted.

This invention relates to a new compound. More particularly, it relates to 2,6-di-t-butyl-4-methylphenyl N-dichloroacetyl-N-methylcarbamate and its use as a herbicide.

It has been found in accordance with the present invention that 2,6-di-t-butyl-4-methylphenyl-N-dichloroacetyl-N-methylcarbamate, which has the structural formula

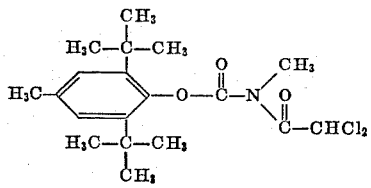

is a new compound which is tolerated by all stages of growth of certain desirable crops such as corn, cotton, barley and rice, but which acts effectively as a preemergence herbicide to kill seedlings of annual weedy grasses.

Annular weedy grasses represent undesired vegetation in fields of crops such as those just mentioned. Except in the case of rice, these grasses can be controlled by post-emergence treatment with known herbicides which are not phytotoxic to the crop plants at the dosages required for control of the grasses. However, rice is very sensitive to the action of most herbicides used for grass control, and there are very few products available which are acceptable.

Probably the most widely used rice herbicide is the compound 3,4-dichloropropionanilide. This compound is applied as a post-emergence herbicide, usually at a rate of about three to about five pounds of the active compound per acre for the control of grasses and many broadleaved weeds. The major disadvantage of this compound is that it has little or no residual activity. As a consequence, if additional weeds germinate after application of the compound, there still may be a weed control problem facing the applicator. In contrast, the compound of this invention is characterized by its pre-emergence activity against annual weedy grasses and by exhibiting a desirable residual activity. The compound of this invention also differs from the compound from which it is prepared, namely 2,6-di-t-butyl-4-methylphenyl N-methylcarbamate. The latter compound also will effect pre-emergence control of annular weedy grasses, but it is phytotoxic to rice and therefore cannot be used in that application.

The 2,6-di-t-butyl-4-methylphenyl N-dichloroacetyl-N-methylcarbamate may be prepared by effecting reaction between a metal salt of 2,6-di-t-butyl-4-methylphenyl N-methylcarbamate and dichloroacetyl chloride (Stefanye et al., J. Am. Chem. Soc., vol. 77 (1955), pages 3663–4). It also may be prepared by the reaction of 2,6-di-t-butyl-4-methylphenyl chlorocarbonate with N-methyl dichloroacetamide. The preferred method, however, comprising heating 2,6-di-t-butyl-4-methylphenyl N-methylcarbamate with dichloroacetyl chloride, in which reaction hydrogen chloride is evolved. An inert solvent of suitable boiling range, such as toluene or xylene, may be utilized, if desired. The temperature of this reaction should be sufficiently high to cause hydrogen chloride formation, but not so high as to cause product decomposition. A preferred reaction temperature range is from about 100° C. to about 140° C.

The preparation of 2,6-di-t-butyl-4-methylphenyl N-dichloroacetyl-N-methylcarbamate and of herbicidal compositions containing it, and evaluation of the herbicidal compositions are set forth in the following examples. In the examples, all parts and percentages are by weight unless otherwise specified.

EXAMPLE 1

A mixture of 2,010 parts of 2,6-di-t-butyl-4-methylphenyl N-methylcarbamate (prepared from 2,6-di-t-butyl-4-methylphenol and methyliso-cyanate) and 2,100 parts of dichloroacetyl chloride was heated at 130° C. for 30 hours while slowly sparging with nitrogen. Upon completion of the reaction, as indicated by essential absence of hydrogen chloride in the off-gas, the reaction mixture was cooled. This resulted in the formation of crystals which were separated from the rest of the reaction mixture by filtration and then washed with hexane. The filter cake was recrystallized from Phillip's solvent, a petroleum distillate boiling at about 135° C., to give 2,897 parts of white crystals having a melting point of 153–155° C. The crystals analyzed for 18.1% chlorine, the theoretical amount for the carbamate product being 18.2%. Infrared and nuclear magnetic resonance spectra were consistent with the structure of 2,6-di-t-butyl-4-methylphenyl N-dichloroacetyl-N-methylcarbamate.

EXAMPLE 2

The compound of this invention was subjected to a screening test for evaluating pre-emergence herbicidal activity. To do this there was prepared an aqueous suspension containing 15 grams of the compound per liter and spraying twice at the rate of 80 gallons per acre for a twenty-pound-per-acre test on soil containing seeds which had been planted 24 hours earlier. The aqueous suspension was made by dissolving the compound in acetone to a concentration of 15 grams per 200 ml. acetone solution, adding "Tween 20" (a sorbitol monolaurate polyoxyethylene derivative) to a concentration of 10 grams per 200 ml. of the acetone solution, and diluting the acetone solution with water to bring the concentration to 15 grams of the compound per liter.

The seeds used in the screening test were millet (Setaria sp.), corn, (Zea mays L.), mustard (Brassica juncea Cross. var. crispifolia), and cotton (Gossypium hirsutum). After treatment the seeds were allowed to germinate and grow for a period of three weeks, and during this time the minimum temperatures were approximately 70° F. During the three-week period the seeds and seedlings were watered, the first two waterings being done by sprinkling in order to leach the compound into the soil. Thereafter, water was applied by subirrigation. Data were taken three weeks after treatment. The numerical values given in the following table are based on a 0–10 rating scale in which 0 means no damage to the plants and 10 indicates complete kill of the plants.

TABLE I

| Compound | Rate | Species | | | |
|---|---|---|---|---|---|
| | | Millet | Corn | Mustard | Cotton |
| 2,6-di-t-butyl-4-methylphenyl N-dichloroacetyl-N-methylcarbamate. | 20 lbs./acre. | 8+ | 2 | 5 | 0 |

EXAMPLE 3

The procedure followed in Example 2 was repeated for 2,6-di-t-butyl-4 - methylphenyl N-dichloroacetyl-N-methylcarbamate in a secondary test for evaluation of herbicidal activity using a total of 15 different plant species. The procedure of Example 2 also was varied to the extent of using rates of application which were 2, 4 and 8 pounds per acre, respectively. The formulation for the two-pounds-per-acre application was prepared by taking 100 ml. of the original formulation, diluting this to 1,000 ml. with a mixture composed of 20% acetone, 1% "Tween 20" and 79% water, and spraying twice with the resulting formulation at the rate of 80 gallons per acre. Similar formulations for the four-pounds-per-acre and eight-pounds-per-acre applications were prepared in the same manner except to use 200 ml. and 400 ml., respectively, of the original formulation. These formulations also were sprayed twice at the rate of 80 gallons per acre. After treatment the seeds were allowed to germinate and grow for three weeks. Ratings on the effect of the compound of this invention were made three weeks after treatment, as in Example 2. The seeds used in this test were as follows:

Millet (*Setaria sp.*)
Cotton (*Goasypium hirsutum*)
Crabgrass (*Digitaria sp.*)
Wild Oats (*Avena fatua*)
Wheat (*Triticum aestiyum L.*)
Barley (*Hordeum valgare L.*)
Soy bean (*Soja Max.*)
Sudan grass (*Sorghum vulgare var. sudanese*)
Rice (*Oryza sativa L.*)
Sorghum (*Sorghum vulgare var. durra*)
Ryegrass (*Lolium perenue L.*)
Downy brome (*Bromus tectorum L.*)
Penncross bentgrass (*Agroatis palustrus Huds.*)
Red top (*Agrostis alba L.*)
Fine fescue (*Festuca ovina L.*)

The folowing tabe summarizes the test data obtained.

TABLE 2

| Species | Application rates in pounds/acre | | |
|---|---|---|---|
| | 2 | 4 | 8 |
| Millet | 8 | 9 | 9 |
| Cotton | 0 | 0 | 0 |
| Crabgrass | 10 | 10 | 10 |
| Wild oats | 0 | 0 | 0 |
| Wheat | 0 | 2 | 4 |
| Barley | 0 | 0 | 0 |
| Soy bean | 0 | 0 | 0 |
| Sudan grass | 2 | 4 | 5 |
| Rice | 0 | 0 | 0 |
| Sorghum | 3 | 3 | 6 |
| Ryegrass | 9 | 9 | 8+ |
| Downy brome | 5 | 4 | 5+ |
| Penncross bent | 10 | 10 | 10 |
| Red top | 10 | 10 | 10 |
| Fine fescue | 10 | 10 | 10 |

EXAMPLE 4

The 2,6-di-t-butyl-4-methylphenyl N-dichloroacetyl-N-methylcarbamate next was evaluated in small scale field tests. The plots utilized had previously been heavily seeded with barnyard grass and signal grass (Brachiaria). In the month of May the plots were planted with rice seed, variety Bluebell, using the drilling technique, The plots were cultipacked and 2,6-di-t-butyl-4-methylphenyl N-dichloroacetyl-N-methylcarbamate, formulated as a 50% wettable powder, was applied at rates of 2, 3, 4, 6 and 8 pounds of the carbamate per acre. After application of the carbamate formulations, the plots were lightly irrigated. The rice plants emerged 10 days later. Because almost five inches of rain had fallen two days after the rice was planted, no additional irrigation was required. Twenty-seven days after planting the rice, there was some evidence of stand reduction in the crop on those plots treated at the rate of 8 pounds of the carbamate per acre. No such reduction was evident for those plots treated at the other rates of application. Grass control was satisfactory at the rates of four, six and eight pounds of the carbamate per acre.

The 2,6-di-t-butyl-4-methylphenyl N-dichloroacetyl-N-methylcarbamate in a herbicidal amount is applied according to any of the methods suitable for herbicide application, for example, as solvent solutions or in combination with solid or liquid extenders or adjuvants. Suitable solvents for the preparation of solvent solutions, which may either be used directly or after dispersion in an immiscible liquid or on a solid carrier, include pine oil, alcohols, hydrocarbon solvents such as xylene, methylated naphthalene, and isophorone, difluorodichloromethane, deodorized kerosene, cyclohexanone, methyl isobutyl ketone, and other similar organic solvents. When such a solvent solution is to be used directly, the concentration of the carbamate contained therein may range from about 10% to about 90% based on the weight of the soltuion. Otherwise, the carbamate concentration in solution will be adjusted so that upon further dilution the desired ultimate concentration results. Amounts of the carbamate ranging from about 0.1% to about 10% by weight of the diluted formulation have generally been found to be suitable.

In many instances it will be most advantageous, for reasons of economy, facility of application, etc., to employ the carbamate in admixture with solid or non-solvent liquid extenders. Such extenders include water and solid carrier materials, preferably those that are readily available and inexpensive, such as talc, attapulgite, natural clays, pyrophylite, diatomaceous earth, kaolin, aluminum and magnesium silicates, montmorillonite, and similar substances such as are used as carriers in the insecticide and herbicide arts. Using such solid materials as extenders, wettable powders and dusts may be formulated. In many instances, the extenders envisioned for use in this invention will themselves possess surface-active properties, in which case they may properly be termed dispersants. In other instances, such as when water is used, the extender possesses no surface-active properties of its own, and an additional material will be added to aid in the dispersion of the carbamate throughout the extender. It should be realized that while it is generally advantageous to distribute as uniformly as possible the carbamate over surfaces to which the herbicide is applied, through the use of surface-active agents when necessary, there may be circumstances under which it is desired to omit such agents; such cases are also intended to be within the scope of this invention. The carbamate concentrations in these extended formulations may vary within wide limits; suitable concentrations for application in the field range from about 0.01% to about 20% of the carbamate based on the total weight of formulation.

The aqueous dispersions contemplated herein comprise the carbamate of this invention, water and a surface-active dispersing agent. Ordinarily an aqueous dispersion will be made up from a concentrate comprised of the carbamate compound and a surface-active agent, which concentrate will subsequently be dispersed in water to a desired concentration. The amount of the carbamate compound contained in a spray properly diluted for application in the field will generally range from about 0.01% to about 20% of such an aqueous dispersion. In most instances, the amount of surface-active agent used will be from about 1% to about 25% of the amount of the carbamate present. Organic solvents may also be contained in the concentrate to aid in effective dispersion.

Suitable surface-active dispersing agents for use in the compositions of this invention are those disclosed in Chemistry of Insecticides, Fungicides, and Herbicides, (Donald E. H. Frear, second edition (1948), pages 280–287) for use with known insecticides. They include neutral soaps of resin, alginic, and fatty acids, with alkali metals, alkyl-amines or ammonia; saponins, gelatins, milk, soluble casein, flour and soluble proteins thereof, sulfite lye, lignin pitch, sulfite liquor, long-chain fatty alcohols having 12–18 carbon atoms and alkali metal salts of the sulfates thereof, salts of sulfated fatty acids, salts of sulfonic acids, esters of long-chain fatty acids and polyhydric alcohols in which alcohol groups are free, solid dispersants such as fuller's earth, China clay, kaolin, attapulgite, and bentonite and related hydrated aluminum silicates having the property of forming a colloidal gel. Among the other surface-active dispersing agents which are useful in the compositions of this invention are the omega-substituted polyethylene glycols of relatively long chain length, particularly those in which the omega substituent is aryl, alkyl, or acyl.

Compositions of the carbamate and surface-active dispersing agent will in some instances have more than one surface-active dispersing agent for a particular type of utility. For example, the carbamate may contain surface-active clay as the sole adjuvant or clay and another surface-active dispersing agent to augment the dispersing action of the clay. Similarly, as is hereinbefore described, the carbamate may have water admixed therewith along with a surface-active dispersing agent, most often the amount of water added being sufficient to form an emulsion. All of these compositions comprising the carbamate and surface-active dispersing agents may contain, in addition, synergists and/or adhesive or sticking agents. Moreover, the recital of specific classes of additives is not intended to limit the scope of this invention thereto, but it is to be understood that the addition of other materials to these formulations is also envisioned.

What I claim and desire to protect by Letters Patent is:

1. A herbicidal composition comprising a herbicidal amount of 2,6-di-t-butyl-4-methylphenyl N - dichloroacetyl-N-methylcarbamate in admixture with a surface-active dispersant.

2. A herbicidal composition comprising a herbicidal amount of 2,6-di-t-butyl-4-methylphenyl N - dichloroacetyl-N-methylcarbamate in solution in a solvent therefor.

3. A herbicidal composition comprising a herbicidal amount of 2,6-di-t-butyl-4-methylphenyl N - dichloroacetyl-N-methylcarbamate dispersed in a major amount of water.

4. A herbicidal composition comprising a herbicidal amount of 2,6-di-t-butyl-4-methylphenyl N - dichloroacetyl-N-methylcarbamate in admixture with a major amount of a solid carrier material.

5. The method of controlling grass vegetation in a rice field, which comprises contacting the soil in said field, prior to emergences of said vegetation, with a herbicidal amount of 2,6-di-t-butyl-4-methylphenyl N - dichloroacetyl-N-methylcarbamate.

References Cited
UNITED STATES PATENTS

| | | | |
|---|---|---|---|
| 3,140,167 | 7/1964 | Haubein | 71—106 |
| 3,337,600 | 8/1967 | Speziale et al. | 71—106 X |
| 3,592,949 | 7/1971 | Teach et al. | 71—106 X |

JAMES O. THOMAS, Jr., Primary Examiner